United States Patent
Pandey et al.

(10) Patent No.: US 12,379,341 B2
(45) Date of Patent: Aug. 5, 2025

(54) pH SENSOR WITH BACKUP pH SENSING ELECTRODE

(71) Applicant: Rosemount Inc., Shakopee, MN (US)

(72) Inventors: Charu L. Pandey, Shakopee, MN (US); Kevin J. Ivanca, Minneapolis, MN (US); Jeff B. Ambrose, Eden Prairie, MN (US)

(73) Assignee: Rosemount Inc., Shakopee, MN (US)

( * ) Notice: Subject to any disclaimer, the term of this patent is extended or adjusted under 35 U.S.C. 154(b) by 544 days.

(21) Appl. No.: 17/710,038

(22) Filed: Mar. 31, 2022

(65) Prior Publication Data

US 2023/0314360 A1 Oct. 5, 2023

(51) Int. Cl.
*G01N 27/30* (2006.01)
*G01N 27/36* (2006.01)
*G01N 27/414* (2006.01)
*G01N 27/416* (2006.01)

(52) U.S. Cl.
CPC ............ *G01N 27/302* (2013.01); *G01N 27/36* (2013.01); *G01N 27/414* (2013.01); *G01N 27/4165* (2013.01)

(58) Field of Classification Search
CPC .. G01N 27/302; G01N 27/36; G01N 27/4165; G01N 27/4167; G01N 27/414
See application file for complete search history.

(56) References Cited

U.S. PATENT DOCUMENTS

| | | | | |
|---|---|---|---|---|
| 5,004,998 A | * | 4/1991 | Horii | G01N 27/403 702/185 |
| 2012/0187000 A1 | * | 7/2012 | Kahn | G01N 27/4167 205/782 |
| 2012/0199884 A1 | * | 8/2012 | Shintani | G01N 27/414 257/253 |
| 2017/0356871 A1 | * | 12/2017 | Hennings | G01N 27/416 |
| 2019/0187091 A1 | * | 6/2019 | Speck | G01N 27/36 |
| 2019/0264161 A1 | * | 8/2019 | Hu | C12M 23/28 |
| 2022/0050077 A1 | * | 2/2022 | Murayama | G01N 27/4167 |

FOREIGN PATENT DOCUMENTS

EP 3795988 A1 3/2021

OTHER PUBLICATIONS

International Search Report and Written Opinion for PCT App# PCT/US2023/063923, Dated Jun. 23, 2023, 12 pages.
Application and Drawings for U.S. Appl. No. 17/709,754, filed Mar. 31, 2022, 28 pages.

* cited by examiner

*Primary Examiner* — Luan V Van
*Assistant Examiner* — Kaylee Tseng
(74) *Attorney, Agent, or Firm* — Christopher R. Christenson; Kelly, Holt & Christenson, P.L.L.C.

(57) ABSTRACT

A pH sensing probe that is configured to be exposed to a process fluid is provided. The pH sensing probe includes a sensor body and a pH glass electrode mounted to the sensor body. A reference electrode has a junction mounted to the sensor body that is configured to be exposed to the process fluid. A backup pH electrode is mounted to the sensor body and configured to be exposed to the process fluid. A pH sensing system and a method of operating a pH sensing system are also provided. In one example, the backup pH electrode is an ISFET electrode that can be automatically switched to when the pH glass electrode is compromised.

18 Claims, 7 Drawing Sheets pH SENSOR WITH BACKUP pH SENSING ELECTRODE

BACKGROUND pH is defined as the negative logarithm of the concentration of hydrogen ions. pH is on a scale of 0-14 and pH values less than 7 confirm acidic conditions in the process, while pH values greater than 7 confirm basic conditions. Typical strong acids such as hydrochloric acid (stomach acid) and battery acid (sulfuric acid) have pH values less than 1 and are very corrosive. Similarly, strong bases such as caustic or bleach and drain cleaners have pH values greater than 13 and are also very corrosive. The pH value of pure water is 7.

Commercially available pH sensors are used in a wide range of applications. One application is the neutralization of drinking water to city pH limits. Here, pH is essential for the safety and health of the community. pH control is employed in caustic scrubbers to determine the amount of caustic that has reacted with noxious gases, and therefore how much caustic to replenish. pH sensors are also used in the control and monitoring of industrial processes. For instance, it has been shown that the optimum pH for penicillin production in bioreactors is between 6.8 and 7.8. Thus, for safety and efficiency reasons, the accuracy of pH measurements is crucial in many processes.

SUMMARY

A pH sensing probe that is configured to be exposed to a process fluid is provided. The pH sensing probe includes a sensor body and a pH glass electrode mounted to the sensor body. A reference electrode has a junction mounted to the sensor body that is configured to be exposed to the process fluid. A backup pH electrode is mounted to the sensor body and configured to be exposed to the process fluid. A pH sensing system and a method of operating a pH sensing system are also provided. In one example, the backup pH electrode is an ISFET electrode.

DETAILED DESCRIPTION OF ILLUSTRATIVE EMBODIMENTS

Many current pH sensors contain a single pH glass electrode. The pH glass of the electrode can break for a number of reasons including, due to operator handling or undissolved solids impinging on the glass. Furthermore, the pH glass can wear over time in applications with caustics, such as sodium hydroxide, which is known to attack the glass. In either case, the user will need to replace the pH sensor. Oftentimes, a replacement pH sensor is not available onsite and lead times for obtaining a new pH sensor can be long. In accordance with various embodiments described below, a sensor and/or pH sensing system is provided having a glass electrode as well as one ion-sensitive field-effect transistor (ISFET) electrode. The ISFET is a non-glass pH technology that calibrates just like the pH glass technology and can be used as a backup electrode until a new sensor is procured. Compared to glass electrode technology, ISFET electrode technology can survive in environments that impact glass wear.

Figure 1:
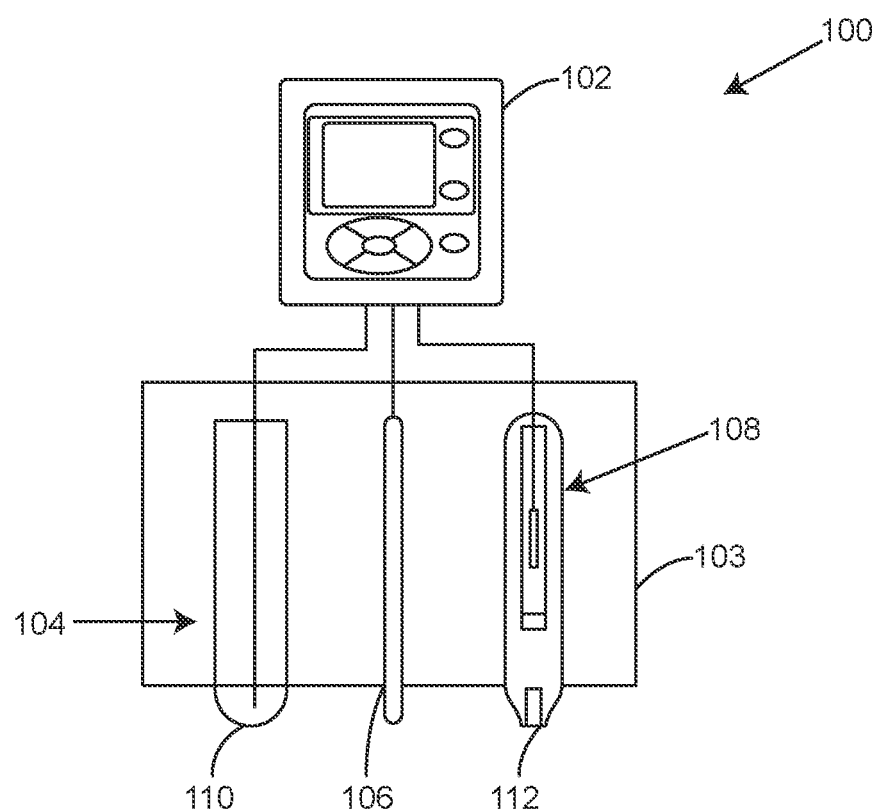
FIG. 1 is a diagrammatic view of a known pH measurement system.

FIG. 1 is a diagrammatic view of a known pH measurement system. Loop 100 includes a transmitter 102 operably coupled to pH sensor 103 having glass electrode 104, temperature element 106, and reference electrode 108. Glass electrode 104, temperature element 106, and reference electrode 108 are generally provided in a single pH sensor probe housing that is disposed to interact with a process fluid. Thus, pH glass bulb 110 is configured to be immersed or contacted by the process fluid while temperature element 106 is configured to provide an electrical indication of the temperature of the process fluid. Typically, temperature element 106 is a resistance temperature device (RTD). Note, while a single wire is shown coupling temperature element 106 to transmitter 102, those skilled in the art will recognize that the single connection represents any suitable number of physical conductors to operably couple a temperature sensor to the transmitter. For example, if temperature detector 106 is a four-wire RTD, then the single line represents four different conductors. Reference electrode 108 generally includes a reference junction 112, which electrically couples pH electrode 104 to reference electrode 108.

Transmitter 102 is able to detect or otherwise measure the electrical signals from pH glass electrode 104, temperature element 106, and reference electrode 108, and provide an indication of pH of the process fluid. As shown, the loop 100 consists of transmitter 102, glass electrode 104, reference electrode 108, and RTD 106 for temperature compensation. The sensing technology is at the end of glass electrode 104 and is called the pH glass bulb 110. Here, hydrogen ions in the process are absorbed into the leeched layer of the pH glass. Because the inside of the glass electrode 104 is filled with pH 7 buffer, the difference in the concentration of hydrogen ions across the pH glass (between the buffer solution inside the glass electrode 104, and the hydrogen ions in the process) generates a millivolt (mV) potential. This millivolt potential drives the flow of electrons in the pH loop and can be modeled by the Nernst Equation set forth below.

$$\text{Nernst Equation: } E = E° - \frac{RT}{zF}\ln Q$$

E is the reduction potential, E° is the standard potential, R is the universal gas constant, T is the process temperature in degrees Kelvin, z is the ion charge (moles of electrons), F is the Faraday constant, and Q is the reaction quotient.

One example of a known pH sensor employing a pH glass electrode is sold under the trade designation Model 3300HT PERph-X High Performance pH/ORP Sensor available from Rosemount Inc., an Emerson Company. Additionally, a commercially-available example of transmitter 102 is sold under the trade designation Model 56 Dual Input Analyzer available from Rosemount Inc.

As set forth above, the glass bulb 110 of glass electrode 104 is susceptible to failure, and when such failure occurs, the entire pH sensor must be replaced. There are several failure modes for pH glass bulb 110. The first failure mode is glass breakage. This can occur either through (a) handling, installation, calibration, or retraction of the sensor; (b) in frigid temperatures, in which the buffer solution inside the pH glass decreases in density as volume increases; and (c) undissolved solids in the process impinging on the pH glass. Since ISFET is a non-glass sensing technology, it does not have susceptibility to cracking or breaking, making it a suitable backup to a glass pH electrode.

Figure 2:
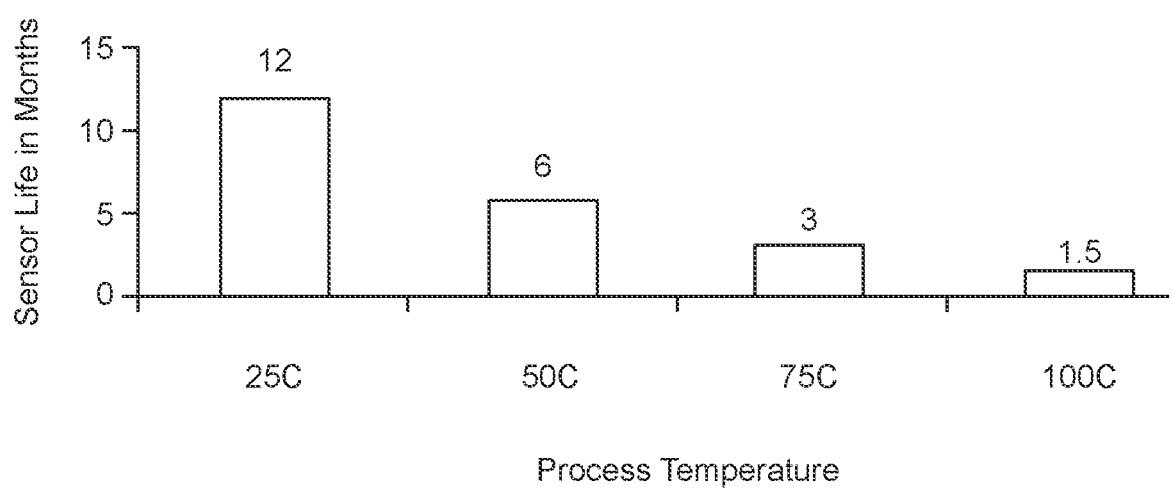
FIG. 2 is a chart of sensor life in months versus process temperature.

A second failure mode for pH glass is aging, typically sped up by high process temperature. These high process temperatures gradually degrade the pH glass. FIG. 2 shows a graph of sensor life in months versus process temperature to illustrate the effect of temperature on life of pH glass. As shown in FIG. 2, it is generally understood that the life of standard pH glass decreases by half with a 25° C. increase in temperature. In the illustrated example, a sensor will have a typical life of 12 months when operated at 25° C. While some pH sensors are offered with specially formulated glass for high temperature applications, called AccuGlass, even these specially adapted pH sensors are aged, to a much lesser extent, by elevated process temperature. Comparatively, the ISFET electrode does not age as fast as a glass electrode and will not degrade as quickly with temperature.

Figure 3:
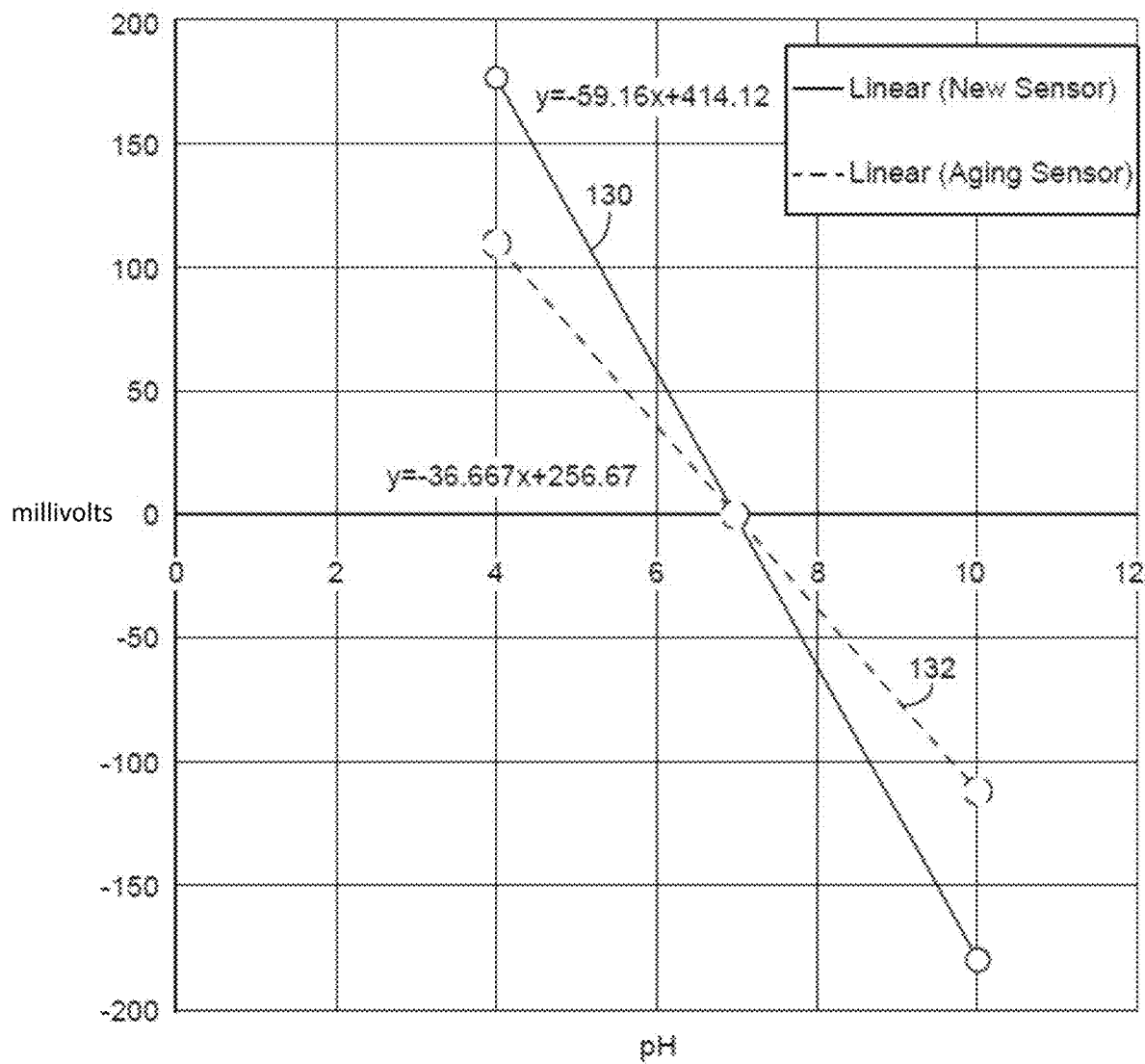
FIG. 3 is a graph of the slope of a new versus aging pH sensor.

FIG. 3 is a chart of the slope of a new versus an aging pH sensor illustrating the change in slope as the sensor ages. The new pH sensor is shown at line 130, while the aging sensor is shown at line 132. The change in slope can be corrected by periodic calibration. pH calibration is generally a two-step process for both pH glass and ISFET electrodes, in which the user places the probe in two separate buffers such as pH 4 and pH 7. The transmitter measures the millivolt signal from the two buffers and calculates a slope and offset based on the measured values. At 25° C., the millivolt value in a pH 4 buffer is typically 177.48 mV, and the millivolt value in a pH 7 buffer is 0.00 mV. As shown in FIG. 3, the ideal slope is thus −59.16 mV/pH. As the pH glass ages over time, the slope decreases. Some transmitters can be programmed with a pH slope fail criteria of −35 mV/pH, although this is considered to be quite low for many applications. Additionally, transmitters can provide the ability to change the slope fail criteria. It is generally accepted that the decrease in slope over time is attributed to the degradation of the pH glass.

A third failure mode of pH glass is by attack of process chemicals, such as sodium hydroxide.

Traditional industrial transmitters have diagnostics to identify and notify the user to glass failure. Known transmitters, such as transmitter 102 described above, generally provide a glass impedance diagnostic for the pH glass sensors. A healthy pH glass for a pH glass sensor will typically have a glass impedance between 50 and 500 megohms, and a broken glass will show a glass impedance much less than 50 megohms. A broken glass fault is exhibited on the display of the transmitter and the pH sensor will no longer respond to buffers. In other words, the broken glass will prevent a millivolt potential difference to be generated across the pH glass. It must be noted that sometimes cracks in the pH glass may even be too small for the naked eye to perceive and thus can only be seen under a microscope.

Figure 4:
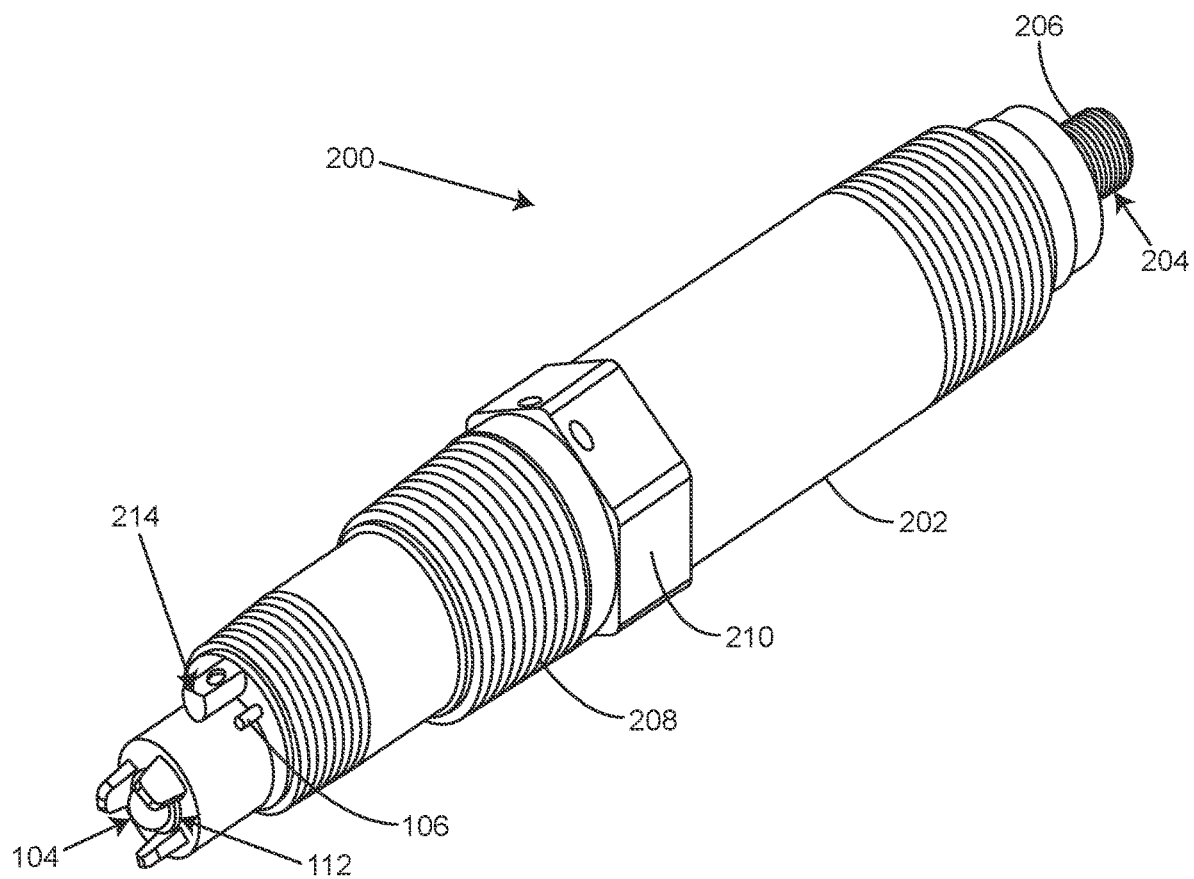
FIG. 4 is a perspective view of a pH sensor having a backup ISFET electrode in accordance with an embodiment of the present invention.

FIG. 4 is a perspective view of a pH sensor having a backup ISFET electrode in accordance with an embodiment of the present invention. Sensor 200 generally includes a relatively cylindrical sensor body 202 having a proximal portion 204 with an electrical connector 206 that is configured to couple to instrument cabling or wires in order to interface pH sensor 200 to a pH transmitter device, such as transmitter 102. Body 202 also includes an externally threaded distal region 208 that is configured to be received by a process coupling or other suitable device, to physically mount the pH sensor. In order to assist with such mounting, pH sensor body 202 typically includes a number of wrench flats 210 to facilitate rotation of body 202 during mounting. pH sensor 200 includes pH glass electrode 104, which may take any suitable form, including the glass electrode shown and described with respect to FIG. 1. This glass electrode is subject to failure in a variety of failure modes set forth above. The primary pH electrode function is provided by pH glass electrode 104, and reference junction 112.

In accordance with one embodiment, pH sensor 200 includes ISFET electrode 214 disposed proximate temperature element 106. Accordingly, when sensor 200 is mounted to the process, pH glass electrode 104, temperature element 106, reference junction 112, and ISFET electrode 114, are all disposed to contact the process fluid. In some implementations, the pH glass electrode 104 and ISFET electrode 214 may be calibrated at the same time. However, it is also expressly contemplated that these electrodes can be calibrated at different times. For example, ISFET electrode 214 can be calibrated when it is called upon to provide its backup function. It is preferred that ISFET electrode 214 always be present alongside glass electrode 104. Further, it is also preferred that ISFET electrode 214 and glass electrode 104 share the same reference electrode, temperature sensing element (e.g., RTD or thermocouple), and solution ground because the glass electrode 104 will typically fail before the other components do. As soon as it becomes apparent that the pH glass electrode 104 has cracked, or otherwise deteriorated to an unacceptable extent, such as by indication of a broken glass fault, low glass impedance, or unresponsiveness to buffers, the pH wires coupled to pH glass electrode 104 are disconnected and the capped ISFET wires coupled to ISFET electrode 214 are connected to the pH signal board. This may be done manually, via a technician responding to the fault indication on the display of a pH transmitter or may be done automatically via electrical switching within the pH transmitter.

Figure 5:
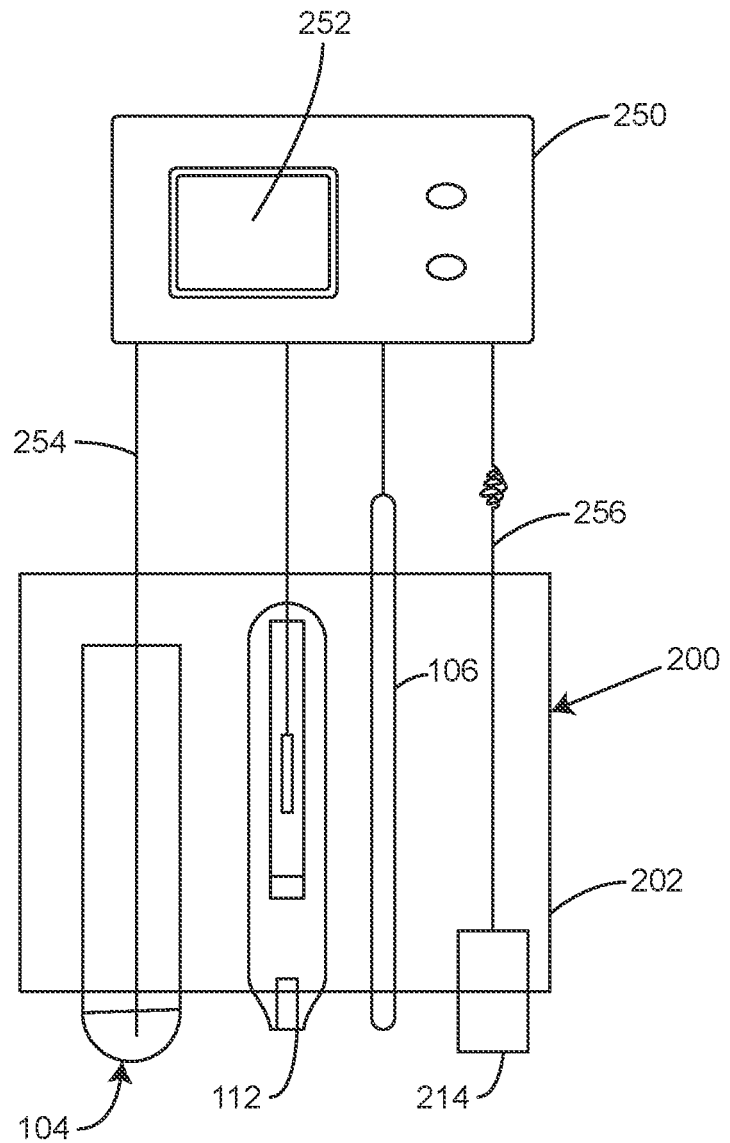
FIG. 5 is a diagrammatic view of a pH sensor having a backup ISFET electrode in accordance with an embodiment of the present invention.

FIG. 5 is a diagrammatic view of pH sensor 200 operably coupled to a pH transmitter 250 in accordance with an embodiment of the present invention. As shown, pH sensor 200 includes pH glass electrode 104, ISFET electrode 214, reference junction 112, and temperature element 106, all disposed within a common pH sensor body 202. Transmitter 250 is shown coupled to pH glass electrode 104, reference junction 112, and temperature element 106. In one embodiment, when transmitter 250 determines that a broken glass fault or a low glass impedance or unresponsiveness to buffers has occurred, transmitter 250 will generate an indication of such on display 252. An operator can then physically detach lead 254 of glass electrode 104, and couple lead 256 to transmitter 250 in its place. Alternatively, in some embodiments, transmitter 250 may be electrically coupled to lead 256 and may automatically begin using the signal from ISFET electrode 214 upon detection of a broken glass fault, low glass impedance, or unresponsiveness to buffers of glass electrode 104.

Figure 6:
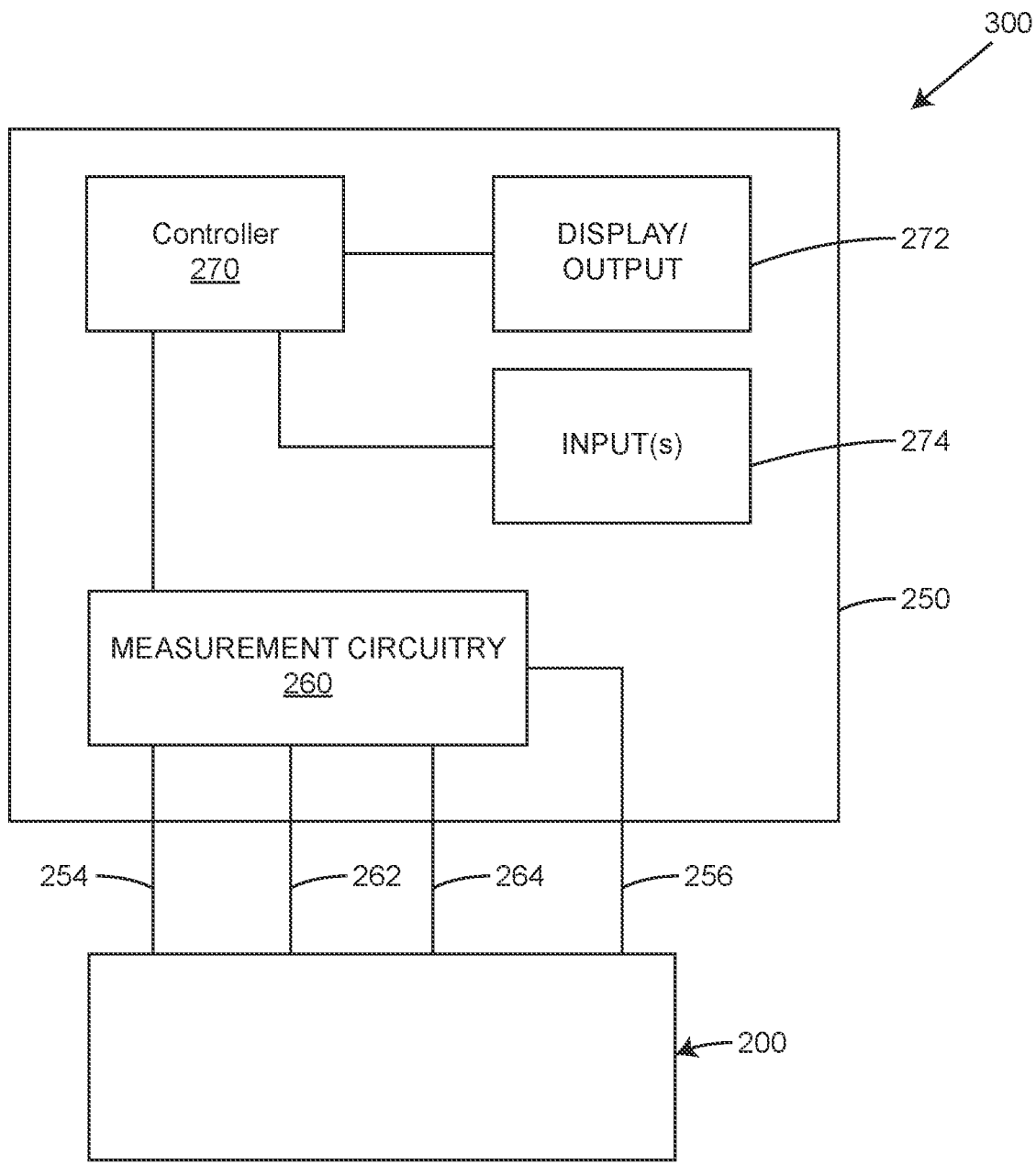
FIG. 6 is a diagrammatic view of a pH transmitter in accordance with an embodiment of the present invention.

FIG. 6 is a diagrammatic view of a pH glass sensor loop in accordance with another embodiment of the present invention. As shown, loop 300 includes transmitter 250 that is coupled to pH sensor 200 which, as described in greater detail above (with respect to FIG. 5) includes a backup ISFET sensor 214. In the embodiment shown in FIG. 6, backup ISFET electrode 214 (shown in FIG. 4) is coupled via conductor 256 to measurement circuitry 260 of transmitter 250. Additionally, a glass bulb pH electrode 104 is coupled to measurement circuitry 260 via conductor 254. The reference electrode and temperature sensing device are coupled to measurement circuitry 260 via respective conductors 262 and 264. Measurement circuitry 260 can include any suitable amplification, linearization, analog-to-digital conversion and/or multiplexing circuitry in order to individually interact with the conductors 254, 256, 262, and 264 to measure signals relevant to the sensors. In the example of pH measurement, measurement circuitry 260 is able to detect the millivolt potential across conductor 262 and one of conductors 254, 256. Similarly, measurement circuitry 260 is able to measure process fluid temperature based on the signal (e.g., resistance) of temperature device 106 via conductor(s) 264.

Measurement circuitry 260 is operably coupled to controller 270 and provides one or more signals indicative of the various electrical parameters of the pH sensor and/or temperature element to controller 270. Controller 270 may be any suitable combination of hardware or software that is able to execute one or more programmatic steps to obtain indications of the millivolt potentials of the pH sensor, obtain indications of the process fluid temperature, and provide a temperature-compensated pH output based on the millivolt potentials. In one embodiment, controller 270 is a microprocessor. Controller 270 is operably coupled to display/output module 272 as well as one or more inputs 274. Display/output module 272 can include a liquid crystal display, or other suitable type of display as well as one or more indicator lights. Additionally, display/output module 272 can include an audible output such as a local alarm. Further, display/output module 272 can include signaling circuitry able to interact with one or more remote devices, such as via a wireless process communication protocol, such as WirelessHART (IEC 62591). The one or more inputs 274 can include suitable user-actuatable buttons, a keypad, a joystick, a microphone, or other suitable user input device(s) capable of receiving user input.

In one embodiment, controller 270 is configured, through hardware, software, or a combination thereof, to perform a glass bulb diagnostic test to identify breakage, deterioration, or aging, of the glass bulb pH electrode and provide a signal indicative of such condition. Further, controller 270 is configured to identify a point in time or occurrence when the signal of the pH glass electrode can no longer be used, and to automatically transition to providing a temperature-compensated pH output based on the backup ISFET pH sensor providing its signal via line 256.

Figure 7:
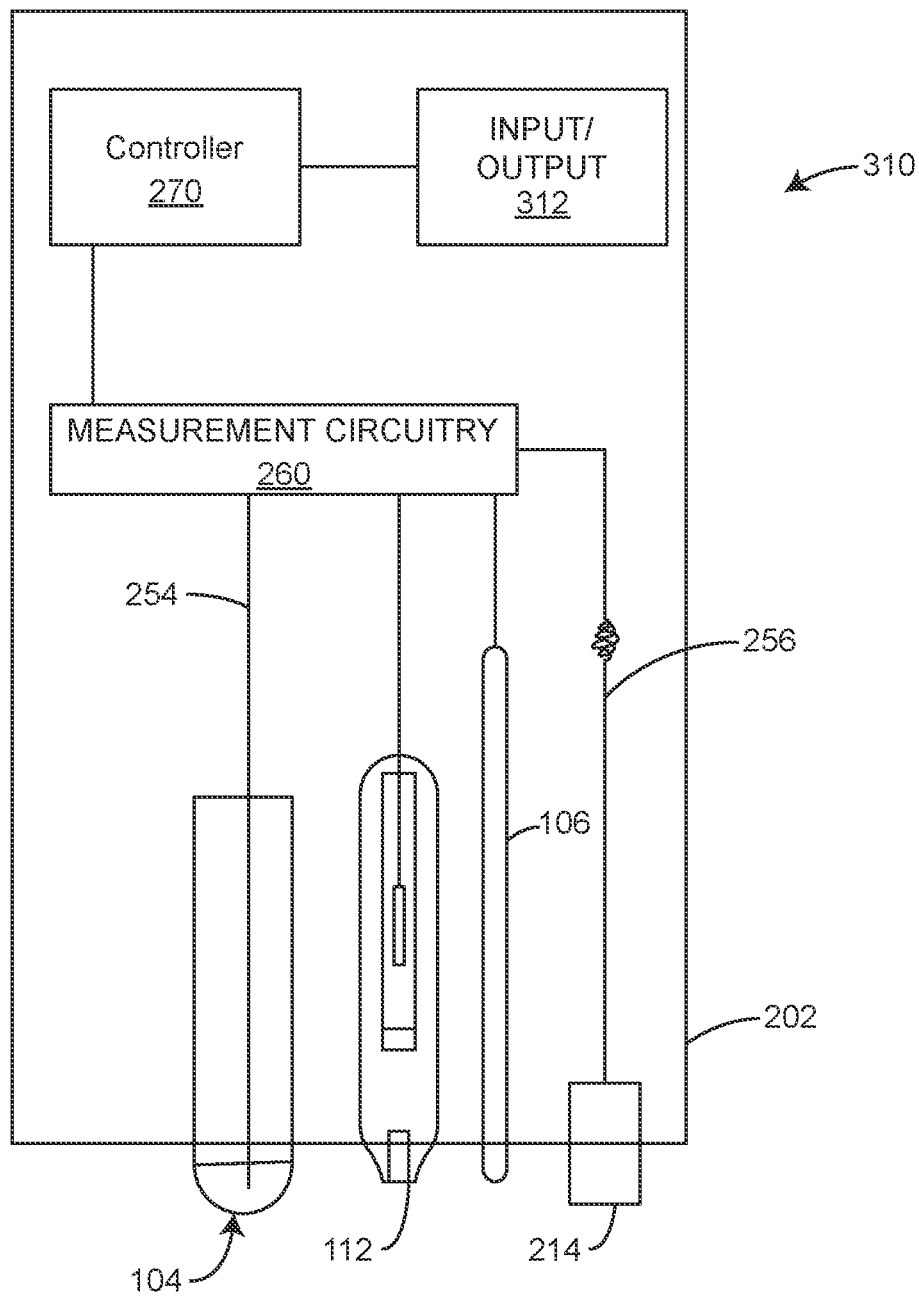
FIG. 7 is a diagrammatic view of a pH sensing system in accordance with another embodiment of the present invention.

FIG. 7 is a diagrammatic view of a pH sensing system in accordance with another embodiment of the present invention. System 310 bears some similarities to system 300 (described with respect to FIG. 6) and like components are numbered similarly. Unlike system 300, system 310 does not require a transmitter such as transmitter 250. Instead, some components of transmitter 250 are instead provided within pH sensor probe housing 202. Thus, measurement circuitry 260, controller 270 are disposed within housing 202. Additionally, input/output circuitry 312 is disposed within housing 202 and coupled to controller 270 in order to allow controller 270 to communicate, preferably using digital communication, with one or more external devices. In one example, input/output circuitry 312 is configured to communicate in accordance with one or more process industry standard communication protocols, such as the wired Highway Addressable Remote Transducer (HART®) protocol, FOUNDATION™ Fieldbus, or a suitable wireless process communication protocol, such as WirelessHART listed above. As with system 300, controller 270 is configured, through hardware, software, or a combination thereof, to perform a glass bulb diagnostic test to identify breakage, deterioration, or aging, of the glass bulb pH electrode and provide a signal indicative of such condition. Further, controller 270 is configured to identify a point in time or occurrence when the signal of the pH glass electrode can no longer be used, and to automatically transition to providing a temperature-compensated pH output based on the backup ISFET pH sensor providing its signal via line 256.

Figure 8:
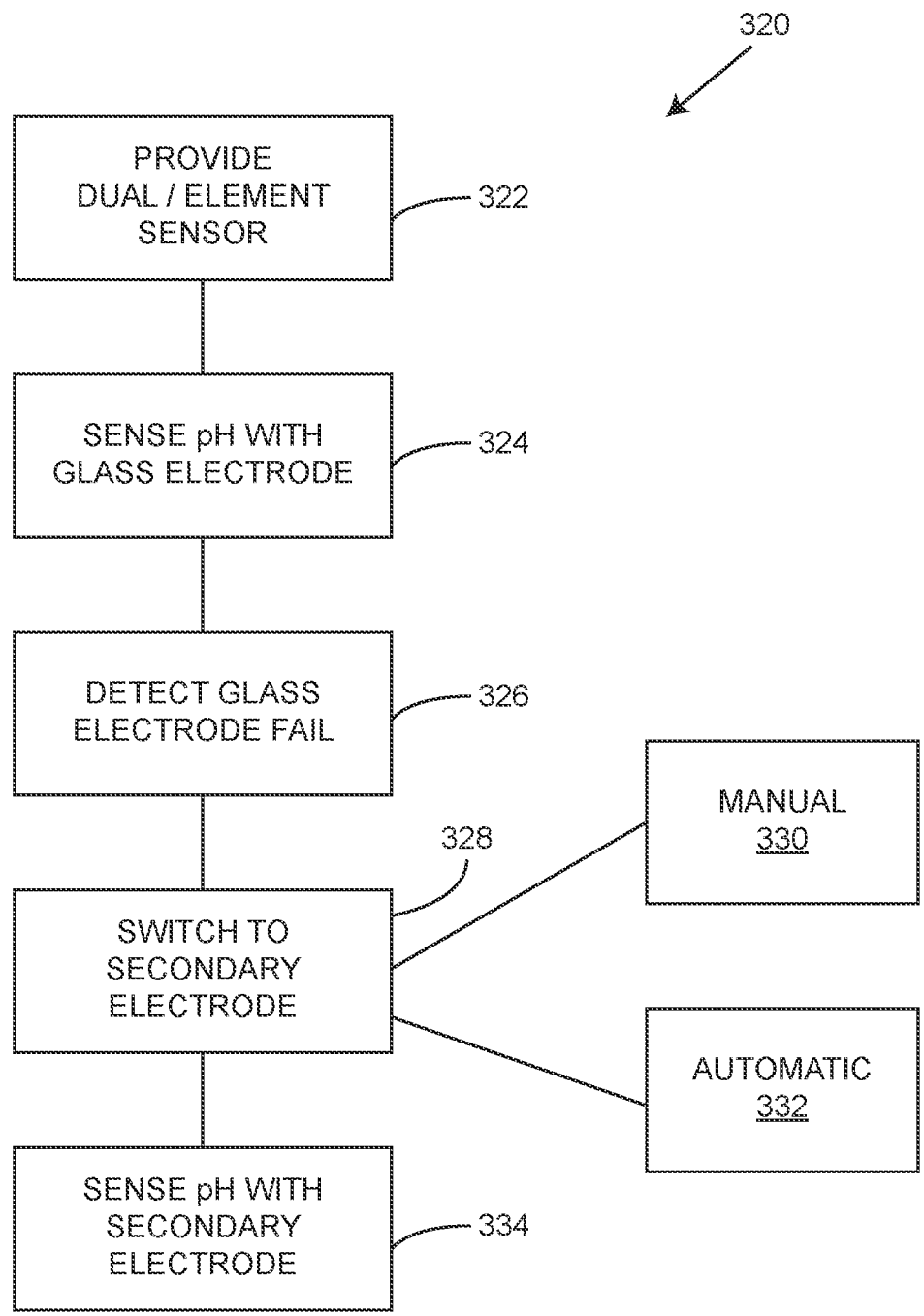
FIG. 8 is a flow diagram of a method of operating a dual electrode pH sensor in accordance with an embodiment of the present invention.

FIG. 8 is a flow diagram of a method of operating a pH glass sensor loop in accordance with an embodiment of the present invention. Method 320 begins at block 322 where a dual element pH sensor having a backup element is provided. In one example, this sensor is sensor 200, described above with respect to FIG. 5. However, it is expressly contemplated that the backup element of the dual element sensor could be a second pH sensing element of a different type, or even the same type as glass bulb electrode 104. Next, at block 324, the pH sensing loop is used to sense pH with a glass electrode, such as electrode 104 (shown in FIG. 5). At block 326, the controller of the transmitter, such as transmitter 250, detects a degradation/or failure of the pH glass electrode. This detection may be the result of a glass bulb diagnostic process run by the transmitter, or it may be caused by detection of low glass impedance or general unresponsiveness to buffers. Further, the glass electrode failure or deterioration may be detected during normal operation, such as a value that is entirely out of range, which can occur when the glass breaks. Further still the pH glass degradation may be done by comparing the detected pH glass degradation to a selected threshold.

Upon the detection of a glass electrode degradation/failure, method 320 transitions to block 328 where the pH loop is switched to the secondary electrode. This can be a manual process, as indicated at reference number 330, wherein a technician physically disconnects the conductor of the glass bulb electrode from the transmitter, and connects a capped, or otherwise unused, conductor of a backup pH electrode, such as an ISFET electrode, to the transmitter. Alternatively, the switch can be automatic, as indicated at reference numeral 332, wherein a controller, such as controller 270 (shown in FIG. 6) automatically switches to determining pH based on a conductor already coupled to the backup pH sensor. In another example, the switching may occur in response to the transmitter receiving a command (e.g. via digital communication employing a process industry standard communication protocol) from an external device (such as a process controller or other suitable device) that causes the transmitter to automatically switch to the ISFET electrode. Finally, at block 334, the pH is sensed with the secondary electrode, and an output is provided, such as on a display of the transmitter. Further, the output can include an indication that the primary pH glass electrode has failed, and that a replacement should be obtained and installed.

Although the present invention has been described with reference to preferred embodiments, workers skilled in the art will recognize that changes may be made in form and detail without departing from the spirit and scope of the invention.

What is claimed is:

1. A pH sensing probe comprising:
   a sensor body;
   a pH glass electrode mounted to the sensor body and configured to be exposed to a process fluid;
   a reference electrode having a junction mounted to the sensor body and configured to be exposed to the process fluid; and
   a non-glass backup pH electrode mounted to the sensor body and configured to be exposed to the process fluid while the pH glass electrode is exposed to the process fluid.

2. The pH sensing probe of claim 1, wherein the non-glass backup pH electrode is an ISFET electrode.

3. The pH sensing probe of claim 2, wherein the ISFET electrode shares the reference electrode with the pH glass electrode.

4. The pH sensing probe of claim 2, wherein the ISFET electrode shares a solution ground with the pH glass electrode.

5. The pH sensing probe of claim 1, and further comprising a temperature sensing element configured to provide an indication of process fluid temperature.

6. The pH sensing probe of claim 5, wherein the temperature sensing element is selected from the group consisting of an RTD and a thermocouple.

7. The pH sensing probe of claim 5, wherein the sensor body has a cylindrical shape with a distal portion and a proximal portion, and wherein the pH sensing probe includes an electrical connector mounted proximate the proximal portion and being operably coupled to the pH glass electrode, the temperature sensing element, the reference electrode, and the non-glass backup pH electrode.

8. The pH sensing probe of claim 1, wherein the sensor body includes at least one externally threaded portion configured to mount the pH sensing probe to a process.

9. The pH sensing probe of claim 1, wherein the reference junction electrically couples to the process fluid.

10. A pH sensing system comprising:
    a pH transmitter including:
      a display,
      at least one user input mechanism,
      measurement circuitry configured to measure at least one electrical characteristic of an attached device,
      a controller coupled to the display, the at least one user input mechanism, and the measurement circuitry, the controller being configured to obtain pH information and process fluid temperature information and provide a temperature compensated pH process output the controller being further configured to detect degradation of a pH glass electrode and automatically switch to a non-glass backup pH electrode and provide an indication that the pH process output is based on the non-glass backup pH electrode;
    a pH sensing probe including:
      a sensor body;
      wherein the pH glass electrode is electrically coupled to the measurement circuitry and mounted to the sensor body, the pH glass electrode being configured to be exposed to a process fluid;
      a temperature sensing element electrically coupled to the measurement circuitry and configured to provide an indication of process fluid temperature;
      a reference electrode electrically coupled to the measurement circuitry and having a reference junction mounted to the sensor body, the reference junction being configured to be exposed to the process fluid; and
      wherein the non-glass backup pH electrode is mounted to the sensor body and configured to be exposed to the process fluid while the pH glass electrode is exposed to the process fluid.

11. The pH sensing system of claim 10, wherein the controller is configured to perform an action if the detected pH glass degradation is beyond a selected threshold.

12. The pH sensing system of claim 11, wherein the action is automatically disconnecting a coupling of the measurement circuitry to the pH glass electrode and automatically coupling the non-glass backup pH electrode to the measurement circuitry.

13. The pH sensing system of claim 11, wherein the action includes switching computation of the pH process output from a combination of the pH glass electrode and the reference electrode, to a combination of the non-glass backup pH electrode and the reference electrode.

14. The pH sensing system of claim 11, wherein the non-glass backup pH electrode is an ISFET electrode.

15. The pH sensing system of claim 11, wherein the controller includes a microprocessor.

16. A pH sensing probe comprising:
    a sensor body;
    a pH glass electrode electrically coupled to the measurement circuitry and mounted to the sensor body, the pH glass electrode being configured to be exposed to a process fluid;
    a reference electrode electrically coupled to the measurement circuitry and having a reference junction mounted to the sensor body, the reference junction being configured to be exposed to the process fluid;
    a non-glass backup pH electrode mounted to the sensor body and configured to be exposed to the process fluid;
    measurement circuitry operably coupled to the pH glass electrode, the reference electrode, and the non-glass backup pH electrode;
    input/output circuitry configured to provide digital communication; and
    a controller coupled to the measurement circuitry and the input/output circuitry, the controller being configured to obtain pH information from the measurement circuitry and process fluid temperature information from the measurement circuitry and provide a pH process output via the input/output circuitry and wherein the controller is configured to automatically detect degradation of the pH glass electrode and switch from the glass pH electrode to the non-glass backup pH electrode.

17. The pH sensing probe of claim 16, wherein the non-glass backup pH electrode is an ISFET electrode.

18. The pH sensing probe of claim 16, and further comprising a temperature sensing element coupled to the measurement circuitry and configured to provide an indication of process fluid temperature, and wherein the controller is configured to provide a temperature-compensated pH process output.

* * * * *